United States Patent [19]
Bowers

[11] Patent Number: 5,961,841
[45] Date of Patent: *Oct. 5, 1999

[54] DOWNHOLE FLUID SEPARATION SYSTEM

[75] Inventor: Bill E. Bowers, Woodlands, Tex.

[73] Assignee: Camco International Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/769,560

[22] Filed: Dec. 19, 1996

[51] Int. Cl.$^6$ .......................... B01D 17/12; B01D 17/038; E21B 43/38

[52] U.S. Cl. ............................ 210/739; 166/53; 166/265; 210/96.1; 210/170; 210/195.1; 210/512.2; 210/747; 210/788; 210/805

[58] Field of Search .................................. 166/53, 75.11, 166/265, 243; 210/96.1, 143, 194, 195.1, 258, 259, 512.1, 512.2, 739, 787, 788, 805, 806, 170, 747

[56] References Cited

U.S. PATENT DOCUMENTS

| | | |
|---|---|---|
| 3,756,076 | 9/1973 | Quichaud et al. . |
| 4,566,317 | 1/1986 | Shakra . |
| 4,622,150 | 11/1986 | Carroll ................................... 210/739 |
| 4,698,152 | 10/1987 | Carroll ................................. 210/512.2 |
| 4,738,779 | 4/1988 | Carroll et al. ....................... 216/512.2 |
| 4,770,243 | 9/1988 | Fouillout et al. ......................... 166/53 |
| 4,805,697 | 2/1989 | Fouillout et al. ........................ 166/265 |
| 4,889,639 | 12/1989 | Hudgins et al. ......................... 210/739 |
| 4,900,445 | 2/1990 | Flanigan et al. ...................... 210/512.1 |
| 4,976,872 | 12/1990 | Grey ........................................ 210/739 |
| 4,983,283 | 1/1991 | Grey ........................................ 210/104 |
| 5,055,202 | 10/1991 | Carroll et al. ........................ 210/512.1 |
| 5,093,006 | 3/1992 | Kalnins .................................. 210/704 |
| 5,296,153 | 3/1994 | Peachey ................................... 210/787 |
| 5,302,294 | 4/1994 | Schubert et al. ........................ 210/739 |
| 5,366,641 | 11/1994 | Hadfield et al. ..................... 210/512.2 |
| 5,404,948 | 4/1995 | Fletcher . |
| 5,456,837 | 10/1995 | Peachey ............................... 210/512.2 |
| 5,507,955 | 4/1996 | Webb ....................................... 210/739 |
| 5,693,225 | 12/1997 | Lee ....................................... 210/512.2 |
| 5,711,374 | 1/1998 | Kjos ..................................... 210/512.2 |
| 5,730,871 | 3/1998 | Kennedy et al. ..................... 210/512.2 |
| 5,830,368 | 11/1998 | Peachey ............................... 210/512.2 |
| 5,860,476 | 1/1999 | Kjos ..................................... 210/512.2 |

FOREIGN PATENT DOCUMENTS

| | | |
|---|---|---|
| 0 069 530 | 6/1982 | European Pat. Off. . |
| 2 194574 | 9/1987 | United Kingdom . |
| WO91/07567 | 5/1991 | WIPO . |
| WO 92/19352 | 12/1992 | WIPO . |
| WO94/13930 | 6/1994 | WIPO . |
| WP96/41065 | 12/1996 | WIPO . |
| WO97/11254 | 3/1997 | WIPO . |
| WO98/13579 | 4/1998 | WIPO . |

*Primary Examiner*—Joseph W. Drodge
*Attorney, Agent, or Firm*—Tobor, Goldstein & Healey, LLP

[57] ABSTRACT

A downhole fluid separation system comprises a fluid separator having a fluid inlet, a first fluid outlet, and a second fluid outlet, with a sensing device for sensing at least one parameter of a first component of a fluid mixture introduced into the fluid inlet of the fluid separator. The ratio of the first component to a second component of the fluid mixture is adjusted as such fluid mixture is introduced into the fluid inlet of the fluid separator in response to a signal provided by the sensing means. By adjusting the component ratio before the fluid is introduced into the fluid separator in response to a signal from a downhole sensing device, acceptable separation efficiency can be achieved over a broad range of fluid component ratios for a given fluid separator.

26 Claims, 5 Drawing Sheets

DOWNHOLE FLUID SEPARATION SYSTEM

BACKGROUND OF THE INVENTION

1. Field of the Invention

The present invention relates to a system for the downhole separation of fluids and, more particularly, to such a system that separates oil from water within a wellbore and that disposes of the separated water within the wellbore.

2. Description of Related Art

In many oil fields around the world the percentage of water recovered with oil from subterranean wellbore has risen to be greater than the percentage of oil. In fact, in many fields, the percentage of oil has decreased to about 20% in an excellent field to less than 2% in a relatively poor field. Therefore, the operator must lift to the surface, and then dispose of, the resulting tremendous volume of water. This situation wastes energy because of the power needed to operate pumps to lift and separate the water, and causes an environmental problem. In many locations the separated water cannot be disposed of on the surface, so the water must be transported to a remote well site to be reinjected into a subterranean formation. There is a need for a method and related system for separating the oil from water downhole so that the quantity of water recovered to the earth's surface can be minimized, and hopefully, eliminated.

One method of downhole oil and water separation is disclosed in U.S. Pat. Nos. 5,296,153 and 5,456,837, wherein wellbore fluids are drawn through a hydrocyclone that separates the oil from water. The separated water is then introduced into a first pump to force the water into a subterranean formation, which is isolated from the formation from which the oil and water mixture is recovered. The separated oil is introduced into a second pump to force the oil to the earth's surface for processing.

In field trials of the fluid separation system disclosed in U.S. Pat. No. 5,296,153, it became apparent that a means for controlling one or more aspects of the downhole separation system is desired. In the past, backpressure control on the downhole hydrocyclones has been provided by a valve on the underflow of the hydrocyclones, as is disclosed in U.S. Pat. Nos. 4,770,243, 4,805,697, 4,900,445, 5,093,006, and 5,456,837. Various inlet flow controls are disclosed in U.S. Pat. Nos. 4,976,872 and 4,983,283. Further, recycle of separated water has been disclosed in U.S. Pat. No. 4,900,445.

One reason for the need for this control is that hydrocyclones are incapable of separating fluid components over the full range of component ratios. This is primarily due to the need for specific geometric configurations, port sizings of the inlets and outlets, and flow rates for specific fluid mixtures. For example, "deoiling" hydrocyclones are used when the fluid mixture is water-external, i.e., a water medium surrounding oil droplets. This means that the deoiling hydrocyclones are designed to separate relatively low viscosity mixtures, with a relatively small portion of the inlet flow exiting the overflow of this hydrocyclone. On the other hand, "dewatering" or "dehydrating" hydrocyclones are used when the fluid mixture is oil-external, i.e., an oil medium surrounding water droplets. This means that the dewatering hydrocyclones are designed to separate higher viscosity mixtures, with a relatively large portion of flow exiting the overflow of this hydrocyclone. Usually, oil is more viscous than water, and this has little effect on the viscosity of a water-external emulsion, since the viscosity of the water dominates. However, an oil-external emulsion will have a viscosity closer to that of the oil.

As a generalization, oil/water fluid mixtures with more than about 65% water are water-external, and a deoiling hydrocyclone would be selected to remove the oil. Likewise, mixtures with less than about 35% water are oil-external, and a dewatering hydrocyclone would be selected to remove the water. The exact percentage of water where the mixture will change from being water-external to oil-external varies with the oil's properties and wellbore conditions, such as temperature and pressure. The basic problem to be overcome is that deoiling hydrocyclones cannot operate effectively on oil-external mixtures, and dewatering hydrocyclones cannot operate effectively on water-external mixtures.

Therefore, this problem leads to the operational problem of having to select the proper hydrocyclone to use, for example, for a 50% water mixture where neither configuration of hydrocyclone can effectively operate. Further, fluid mixtures recovered from subterranean reservoirs change over time due to the depletion of the oil, reduction of formation pressure, and the like, so that in the past the well operator would need to remove and exchange the hydrocyclones as the fluid mixtures changes.

There is a need for a fluid separation system that can be used with one or more configurations of fluid separators, and can be adjusted to ensure that acceptable separation efficiency can be achieved over a broad range of fluid component ratios for a given fluid separator, as well as eliminating the need to replace the existing fluid separators when the fluid mixtures change.

SUMMARY OF THE INVENTION

The present invention has been contemplated to overcome the foregoing deficiencies and meet the above described needs. Specifically, the present invention is a downhole fluid separation system used with submergible pumping systems to separate downhole fluids into at least a first and a second component. The system comprises one or more fluid separators, each having a fluid inlet, a first fluid outlet, and a second fluid outlet. A device senses at least one parameter of the fluid mixture introduced into the fluid inlet of the fluid separator. The ratio of the first component to the second component of the fluid mixture is adjusted and is introduced into the fluid inlet of one or both of the fluid separators in response to a signal provided by the sensing means. By adjusting the component ratio, acceptable separation efficiency can be achieved over a broad range of fluid component ratios for a given fluid separator, as well as eliminating the need to replace the existing fluid separators when the fluid mixtures change.

DETAILED DESCRIPTION OF THE PREFERRED EMBODIMENTS

Figure 1:
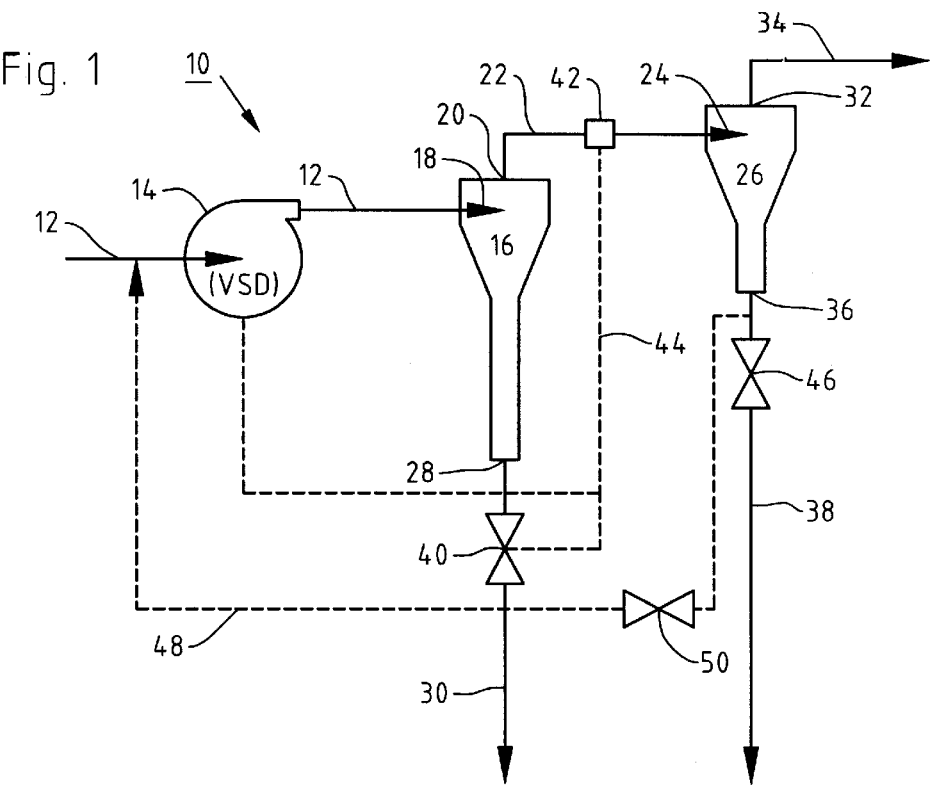
FIG. 1 is a schematic flow diagram of one preferred embodiment of a fluid separation system of the present invention for wellbore fluid streams with a relatively high water content.

As briefly described above, the present invention comprises a fluid separation system to be installed within a wellbore that penetrates one or more production formations which contain fluids, such as oil, condensate, gas, and water, and one or more water disposal formations, which an operator has chosen to use for the discharge and elimination of fluids that are not to be brought to the earth's surface. The fluid separation system of the present invention can be used in wellbores where the production formation(s) is closer to the earth's surface than the discharge formation(s), and visa-versa. Since, the fluid separation system of the present invention can be used in vertical, inclined and horizontal wellbores, references herein to "above" and "below" are merely for ease of understanding and should not be considered in any way limiting.

The fluid separation system of the present invention utilizes fluid separators that separate fluids into differing components, such as by density, particle size, emulsion content, and the like. Devices that are suitable for use in the present invention include membrane fluid separators, electrostatic fluid separators, and centrifugal separators. The centrifugal separators used in the present invention can be separators where an internal device within the assembly rotates to cause the fluids to rotate and thereby be separated, external devices where the assembly rotates to cause the fluids to rotate and thereby be separated, and preferably devices where the fluids are caused to rotate by the shape of the separator. Hydrocyclones are most preferred due to their relatively low cost, lack of moving parts, and acceptable oil-water separation efficiency.

Throughout the following discussion the term "conduit" will be used in relation to conveyance of fluids from one location to another. The term "conduit" shall mean any device, member, tube, pipe, hose, or space that can route a fluid from one location to another. In the context of downhole devices, a "conduit" will most likely refer to a pipe either within or without of a assembly, or an annular space within the assembly, between the outside of the assembly and a pipe or casing in the wellbore or the wellbore wall, or between one or more concentric pipes or casings and the wellbore wall.

As previously mentioned, the present invention is a downhole fluid separation system used with submergible pumping systems to separate downhole fluids into different components, recover one of the separated fluid components, such as the lighter fluids, to the earth's surface, and dispose a second of the separated fluid components, such as the heavier fluids, downhole.

The fluid separation system includes one or more assemblies or housings connectable one to another, each assembly having one or more fluid separators, such as hydrocyclones, therein with the inlet(s) of each fluid separator in communication with an inlet conduit, the overflow of each fluid separator in communication with an overflow conduit, and the underflow of each fluid separator in communication with the underflow conduit. The fluid separation system can be configured for parallel flow where the conduits conveying fluids downstream of a first assembly have a greater cross-sectional flow area than corresponding conduits in an adjacent second assembly. Also, the fluid separation system can be configured for series flow, for either the separated lighter or the separated heavier fluids.

In the following discussions reference will be made to downhole fluid pumping systems. Such systems can be downhole electric submergible pumping systems, as well as other downhole pumping systems, such as sucker rod pumps and other surface driven pumps. For the purposes of this invention, the type of pump is not critical. Suitable downhole pumps are multi-stage centrifugal pumps, positive displacement pumps, screw pumps, vane pumps, turbines, gear pumps, and the like.

One preferred embodiment of the present invention is shown in FIG. 1, which shows a fluid separation system 10 for use where the water content is relatively high, such as about 65% and above. In this system the fluid mixture is directed to a deoiling fluid separator, and the overflow is then directed to a dewatering fluid separator to remove as much water as possible from the oil being transported to the earth's surface. In FIG. 1, a fluid mixture, such as oil and water from one or more subterranean formations, is passed through a conduit 12, through a pump 14 (which is desired but totally optional), and into a first fluid separator 16 through a fluid inlet 18. Within the first fluid separator 16 the fluid stream is separated into at least two fluid components. These fluid components can be separated based upon fluid density, particle size, hydrophilic or hydrophobic characteristics, electrical capacitance, magnetic characteristics, and the like. In the case of hydrocyclones, the fluid stream's components will be separated based primarily upon fluid density.

A lighter density separated fluid component exits the first fluid separator 16 through a first fluid outlet or overflow 20. This fluid is passed through a conduit 22 into a fluid inlet 24 of a second fluid separator 26. A heavier density separated fluid component exits the first fluid separator 16 through a second fluid outlet or underflow 28. This fluid is passed through a conduit 30 for passage of this fluid to additional fluid separation devices and/or disposal into a subterranean formation.

The lighter density separated fluid component is further separated within the second fluid separator 26. The lighter density separated fluid component exits the second fluid separator 26 through a first fluid outlet or overflow 32. This fluid, which is essentially dry crude oil, is passed through a conduit 34 for passage of this fluid to additional fluid separation devices and/or transport to the earth's surface. A heavier density separated fluid component exits the second fluid separator 26 through a second fluid outlet or underflow 36. This fluid is passed through a conduit 38 for passage of this fluid to additional fluid separation devices and/or disposal into a subterranean formation.

The inventor hereof has found that to improve the separation efficiency of fluid separation systems for a wide range of oil and water ratios, that the fluid component makeup or ratio of the fluid entering the fluid separator needs to be adjusted or "conditioned". For this purpose, the back pressure across the first fluid separator 16 needs to be adjusted to ensure that the overflow stream that is directed to the second fluid separator 26 remains oil-external, i.e., the water content needs to be kept below about 35%. When this adjustment takes place the second fluid separator 26 can operate as desired to provide relatively dry crude oil for transport to the earth's surface. However, care must be taken to prevent forcing the overflow of the first fluid separator 16 to contain too little water, which will cause too much oil to exit the underflow of the first fluid separator 16. Simply stated, if the back pressure on the underflow outlet 28 of the first fluid separator 16 is increased then the water content in the overflow increases, and if the back pressure is decreased then the water content in the overflow decreases.

The fluid flow rate, back-pressure or residence time of the fluids within the first fluid separator 16 can be adjusted by the operation of one or more disc, rotary, ball, gate or plug valves 40 located on the conduit 30. An alternative method of controlling the fluid flow through the first fluid separator 16 is to use a variable diameter opening or orifice in the fluid inlet 18, overflow 20 and/or the underflow 28. The valve 40 can be adjusted manually or remotely by the operation of electrical, electromechanical, pneumatic or hydraulic operation devices, as are well known to those skilled in the art.

Surface measuring of a parameter associated with the separated oil can be used; however, for the achievement of maximum separation efficiency, it is preferred that measuring of a parameter associated with one or more of the fluid streams be achieved downhole within the separation system itself. The desired fluid parameter can measured at any suitable location, such as in the conduits 12, 22, 30, 34, and 38. In the embodiment shown in FIG. 1, the desired fluid parameter is sensed by a sensor 42 located on the conduit 22 that leads from the overflow 20 of the first fluid separator 16 to the inlet 24 of the second fluid separator 26. The sensor 42 sends a signal indicative of one or more measured fluid parameters to downhole control equipment, as will be discussed below, and/or to the surface for recording and analysis, as well as for control purposes.

It is preferred that the sensor 42 include or be connected to a suitable microprocessor with appropriate computer coding to determine what appropriate action, if any, is needed to maximize the separation efficiency of the fluid separation system 10. Once appropriate action to be taken is determined, either at the surface or downhole, appropriate signals are sent through fiber optic, electrical, hydraulic, pneumatic, or the like control line(s) 44 to the valve 40 to cause such valve to be adjusted to alter the selected fluid streams' flow rate.

The fluid parameter to be sensed/measured can be differential pressure, differential pressure ratio, flow rate, pressure, temperature, and/or viscosity. In addition, the fluid parameter can be the percentage of hydrocarbons in the selected fluid stream ("oil cut"), the percentage of water in the selected fluid stream ("water cut"), the fluid density, the fluid's electrical conductivity, the fluid's dielectric constant, microwave energy absorption, light reflectance, ultraviolet light absorption, neutron absorption, electron density, and the like. It is preferred that the sensor 42 on the conduit 22 measure the water content of the fluid stream by the use of a suitable detector, such as a microwave energy absorption device.

Figure 4:
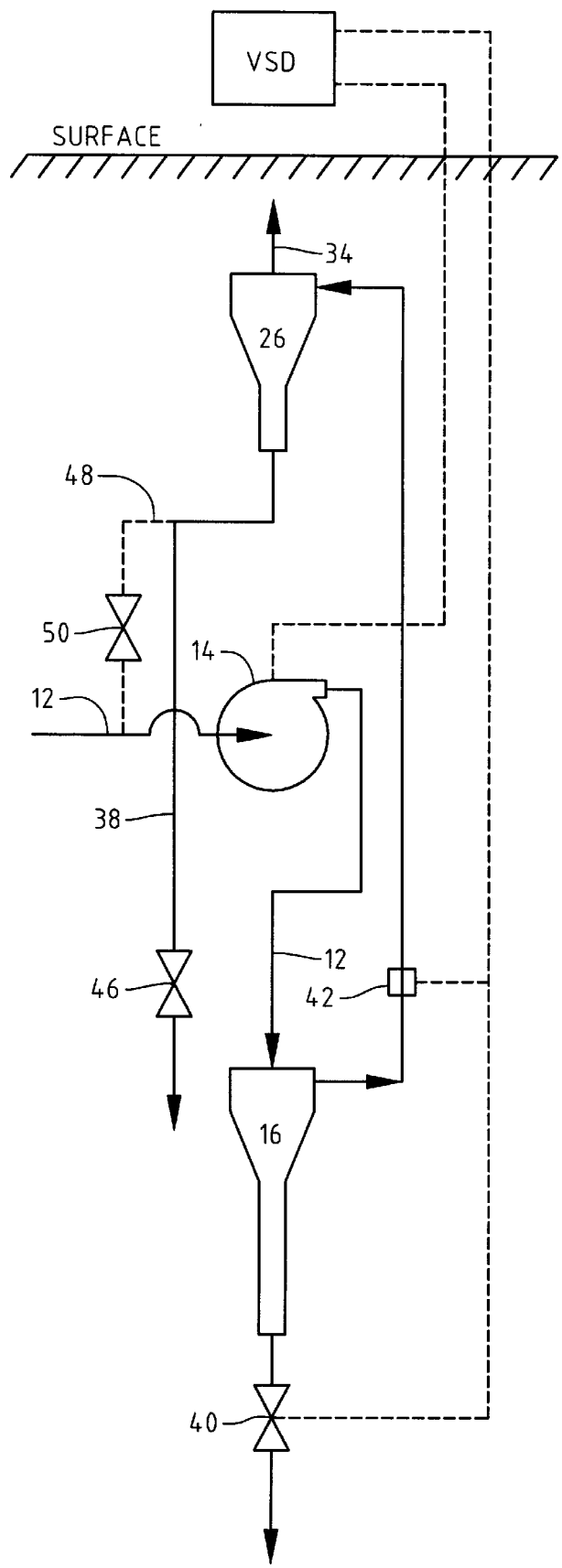
FIG. 4 is a schematic flow diagram of one preferred embodiment of a fluid separation system of the present invention for wellbore fluid streams with a relatively low water content arranged in a downhole structure.

As shown in FIG. 4, to provide additional fluid conditioning control, the back pressure across the second fluid separator 26 may be adjusted, in a like manner as described above, by a valve 46 located on the conduit 38. The valve 46 can be adjusted in response to a signal provided from the sensor 42 or from a separate sensor (not shown) located on the conduit 34, or by examination of the fluid stream at the earth's surface. In addition, all or a portion of the underflow of the second fluid separator 26 passing through the conduit 38 may be recycled back to the inlet conduit 12 of the first fluid separator 16 through a recycle conduit 48 to condition the inlet feed of the first fluid separator 16 and/or to further process the "oily water" prior to its disposal. The proportion of the fluid to be recycled through the conduit 48 is controlled by a valve 50, which is operated in any manner as above described, and in response to a signal from the sensor 42 or other sensors located on one or more of the conduits, as above described.

Figure 2:
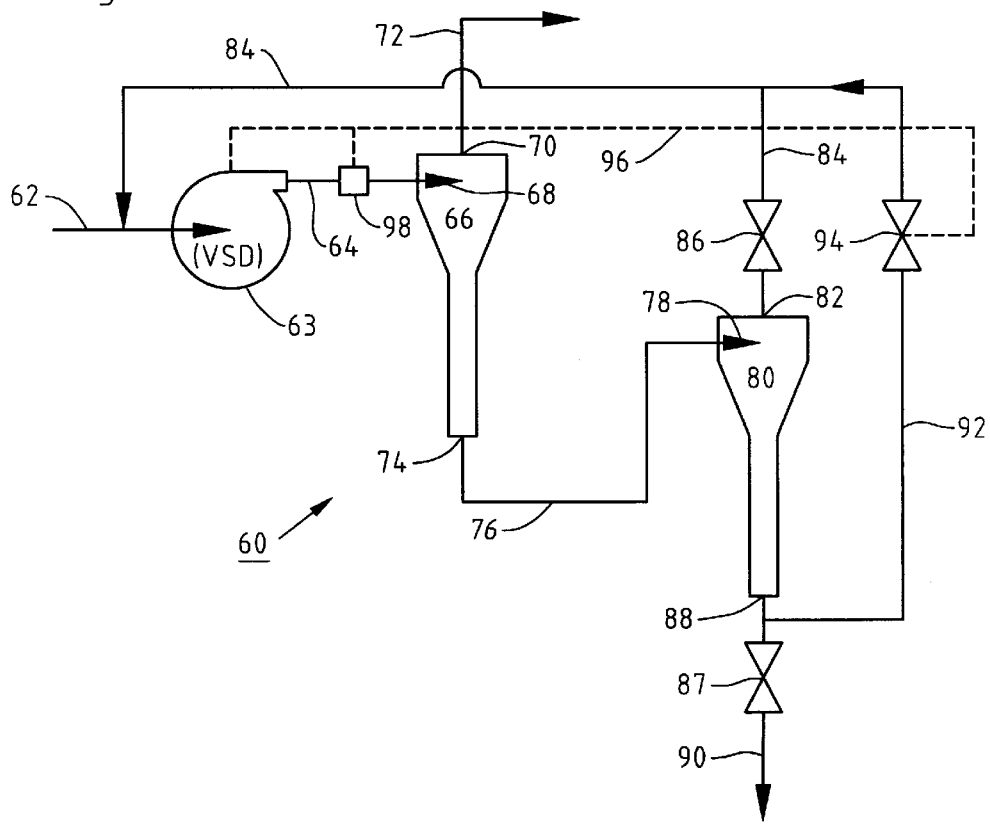
FIG. 2 is a schematic flow diagram of one preferred embodiment of a fluid separation system of the present invention for wellbore fluid streams with a relatively moderate water content.

For the situation where the percentage of water in the fluid to be separated is greater than about 35% but less than about 65%, for example about 50%, an alternate preferred embodiment of a fluid separation system 60 of the present invention, as shown in FIG. 2, can be used. The fluid separation system 60 passes the fluid mixture to be treated to a deoiling fluid separator that has recycle water added to its feed to raise the water cut to about 65% and above. The fluid mixture from the subterranean earthen formations is passed through a conduit 62, through a fixed speed or a variable speed pump 63 (which is desired but totally optional), through a conduit 64 and into a first fluid separator 66 through a fluid inlet 68.

A lighter density separated fluid component exits the first fluid separator 66 through a first fluid outlet or overflow 70. This fluid, which is essentially dry crude oil, is passed through a conduit 72 for passage of this fluid to additional fluid separation devices and/or transport to the earth's surface. A heavier density separated fluid component exits the first fluid separator 66 through a second fluid outlet or underflow 74. This fluid is passed through a conduit 76 into an inlet 78 of a second fluid separator 80. In the configuration shown in FIG. 2, the second fluid separator 80 is a deoiling fluid separator of the same general type, size and configuration as the first fluid separator 66. However, fluid separators of differing type, size and configuration can be used as is desired.

Figure 5:
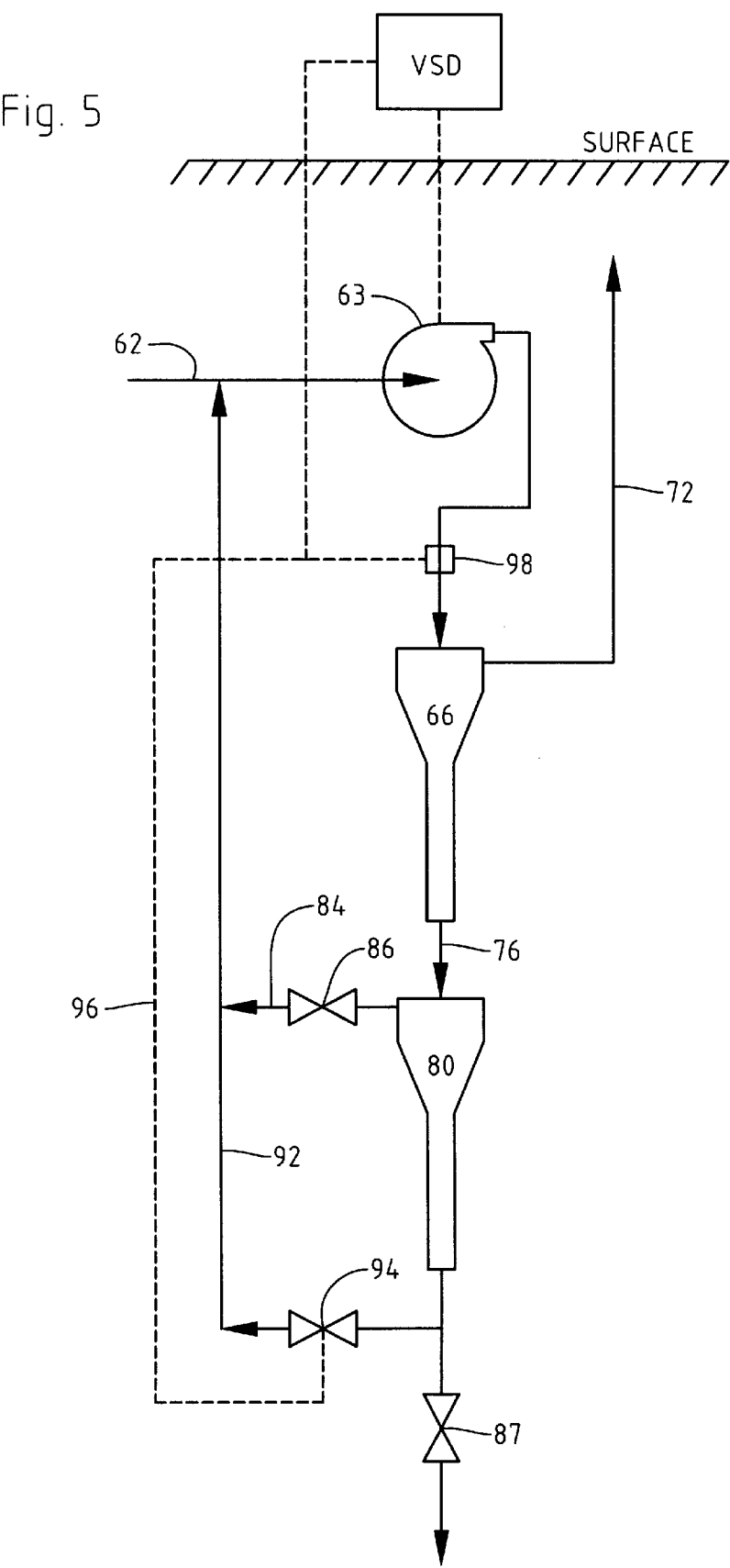
FIG. 5 is a schematic flow diagram of one preferred embodiment of a fluid separation system of the present invention for wellbore fluid streams with a relatively low water content arranged in a downhole structure.

As shown in FIG. 5, a lighter density separated fluid component exits the second fluid separator 80 through a first fluid outlet or overflow 82. This fluid is passed through a recycle conduit 84 to the inlet conduit 62 of the first fluid separator 66 to retreat what is a relatively small volume of oily water. The flow rate of the fluid to be recycled through the conduit 84 is controlled by a valve 86 and/or valve 87, of any suitable type as described previously and which is operated in any manner as above described, and which is operated in response to a signal from a sensor located on one or more of the conduits, as above described.

The higher density separated fluid exits the second fluid separator 80 through a second fluid outlet or underflow 88, and into a conduit 90 for passage of this fluid to additional fluid separation devices and/or disposal into a subterranean formation. All or a portion of the underflow of the second fluid separator 80 passing through the conduit 90 can be recycled back to the inlet conduit 62 of the first fluid separator 66 through a recycle conduit 92. The proportion of the fluid to be recycled through the conduit 92 is controlled by a valve 94, which is operated in any manner as above described, and in response to a signal provided by a control line 96 from a sensor 98 or other sensors located on one or more of the conduits, all as above described.

With the fluid separation system shown in FIG. 2, as opposed to the system shown in FIG. 1, the sensor 98 and the valve 94 are used to control the recycle of fluids rather than the outlet pressure of one or more of the fluid separators. When the valve 94 is opened, more water is added to the fluid mixture that is introduced into the first fluid separator 66, and when the valve 94 is closed, less water is added to the fluid mixture, so that the oil/water ratio is adjusted to be within acceptable operating limits of the first fluid separator 66.

Figure 3:
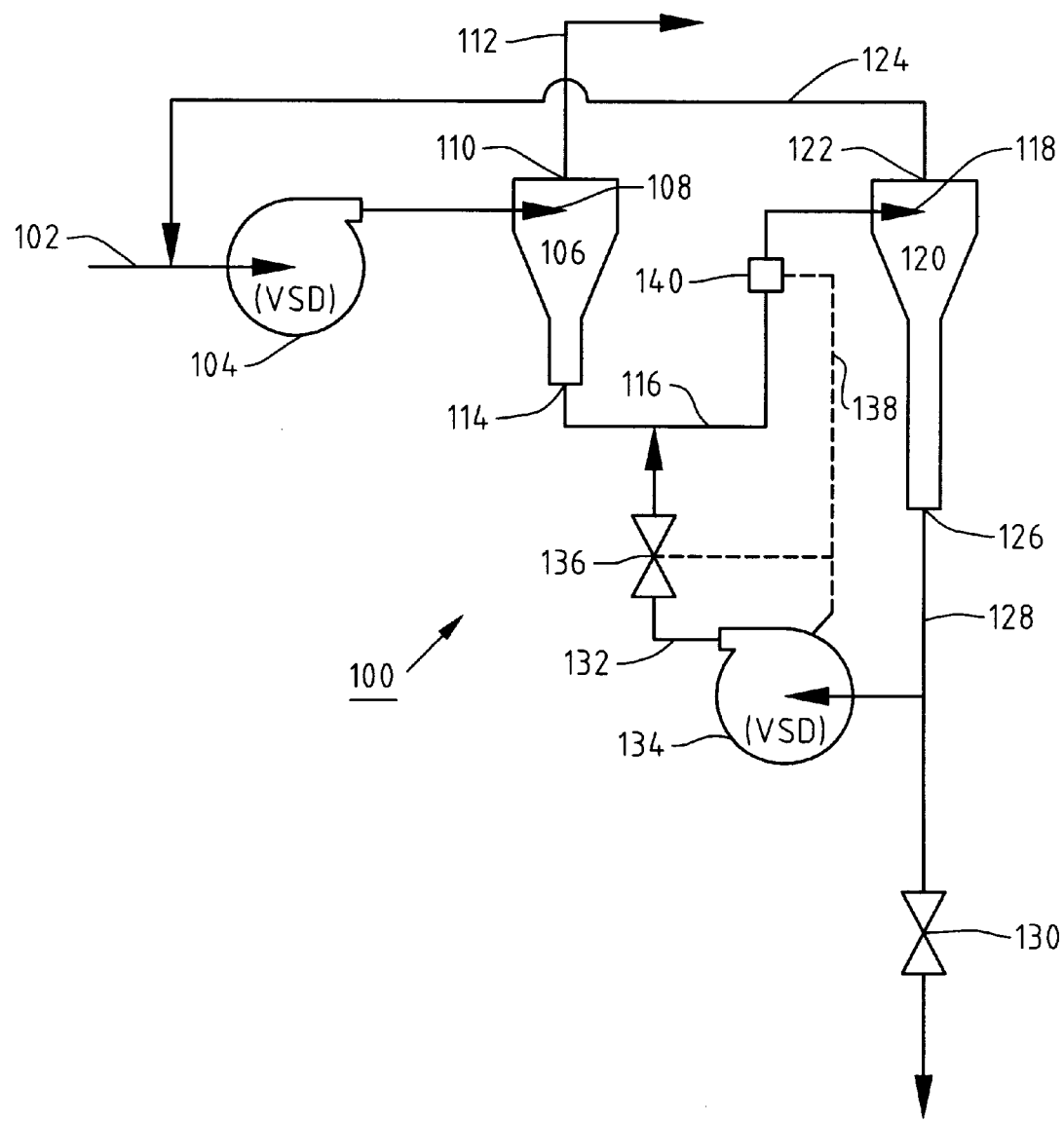
FIG. 3 is a schematic flow diagram of one preferred embodiment of a fluid separation system of the present invention for wellbore fluid streams with a relatively low water content.

For the situation where the percentage of water in the fluid to be separated is about 35% or less, an alternate preferred embodiment of a fluid separation system 100 of the present invention, as shown in FIG. 3, can be used. The fluid separation system 100 passes the fluid mixture to be treated to a dewatering fluid separator, since the feed will be oil-external, and then to a deoiling fluid separator. The control system is used to adjust the amount of water that is recycled to ensure that the inlet feed to the second fluid separator will be water-continuous, i.e., be of about 65% water or above. The fluid mixture from the subterranean earthen formations is passed through a conduit 102, through a pump 104 (which is desired but totally optional), and into a first fluid separator 106 through a fluid inlet 108. A lighter density separated fluid component exits the first fluid separator 106 through a first fluid outlet or overflow 110. This fluid, which is essentially dry crude oil, is passed through a conduit 112 for passage to additional fluid separation devices and/or pumping to the earth's surface. A heavier density separated fluid component exits the first fluid separator 106 through a second fluid outlet or underflow 114. This fluid is passed through a conduit 116 into an inlet 118 of a second fluid separator 120.

A lighter density separated fluid component exits the second fluid separator 120 through a first fluid outlet or overflow 122. This fluid is passed through a recycle conduit 124 to the inlet conduit 102 of the first fluid separator 106. The higher density separated fluid exits the second fluid separator 120 through a second fluid outlet or underflow 126, and into a conduit 128 for passage of this fluid to additional fluid separation devices and/or disposal into a subterranean formation.

The fluid flow rate, back-pressure or residence time of the fluids within the second fluid separator 120 can be adjusted by the operation of one or more valves 130 located on the conduit 128. An alternative method of controlling the fluid flow through the second fluid separator 120 is to use a variable diameter opening or orifice in the fluid inlet 118, overflow 122 and/or the underflow 126. The valve 130 is operated in any manner as above described, and in response to a signal provided by one or more sensors located on one or more of the conduits, all as above described.

Figure 6:
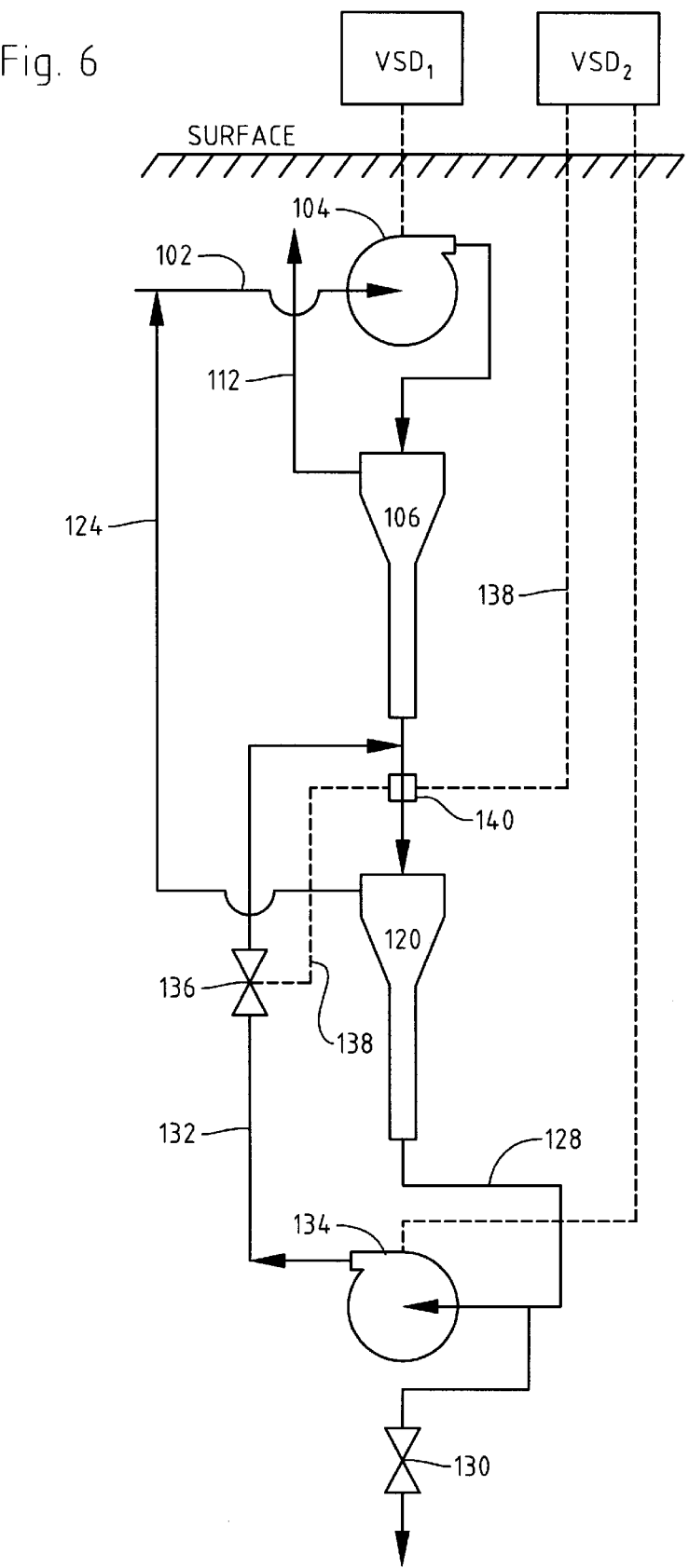
FIG. 6 is a schematic flow diagram of one preferred embodiment of a fluid separation system of the present invention for wellbore fluid streams with a relatively low water content arranged in a downhole structure.

As shown in FIG. 6, all or a portion of the underflow of the second fluid separator 120 passing through the conduit 128 can be recycled back to the inlet conduit 116 of the second fluid separator 120 through a recycle conduit 132. An optional pump 134 can be used on the conduit 132 to ensure that this recycled fluid can overcome the fluid head from the first pump 104. The proportion of the fluid to be recycled through the conduit 132 is controlled by a valve 136 and/or the operation of the pump 134 with or without a variable speed drive. The valve 136 and/or the pump 134 are operated in any manner as above described, and in response to a signal provided by a control line 138 from a sensor 140 on the conduit 116 or other sensors located on one or more of the other conduits, all as above described.

In each of the preferred embodiments described above, the ratio of the first component to a second component of the fluid mixture is adjusted and is then introduced into a fluid inlet of a fluid separator in response to a signal provided by the sensing means. By adjusting the component ratio as the fluid is introduced, acceptable separation efficiency can be achieved over a broad range of fluid component ratios for a given fluid separator, as well as eliminating the need to replace the existing fluid separators when the fluid mixtures change.

Wherein the present invention has been described in particular relation to the drawings attached hereto, it should be understood that other and further modifications, apart from those shown or suggested herein, may be made within the scope and spirit of the present invention.

What is claimed is:

1. A downhole fluid separation system comprising:
   a fluid separator having a fluid inlet, a first fluid outlet, and a second fluid outlet;
   means for sensing at least one parameter of a first component of a fluid mixture introduced into the fluid inlet of the fluid separator;
   a recycle conduit connecting at least one of the first or second fluid outlets to the fluid inlet without a reservoir therebetween for passing fluid directly from the at least one of the first or second fluid outlets to the fluid inlet: and
   means for adjusting the volume of fluid passed through the recycle conduit in response to a signal provided by the sensing means.

2. A downhole fluid separation system comprising:
   a first fluid separator and a second fluid separator, each fluid separator having a fluid inlet, a first fluid outlet, and a second fluid outlet;
   the fluid inlet of the first fluid separator being in communication with a source of a fluid mixture to be separated into at least a first component and a second component;
   the first fluid outlet of the first separator being in communication with the fluid inlet of the second fluid separator;
   means for sensing at least one fluid parameter of fluid introduced into the fluid inlet of the second fluid separator;
   a recycle conduit connecting at least one of the first or second fluid outlets of the second fluid separator to the fluid inlet of the second fluid separator without a reservoir therebetween for diverting fluid directly from the at least one of the first or second fluid outlets of the second fluid separator to the fluid inlet of the second fluid separator; and
   means for adjusting the volume of fluid passed through the recycle conduit in response to a signal provided by the sensing means.

3. A downhole fluid separation system comprising:
   a first fluid separator and a second fluid separator, each fluid separator having a fluid inlet, a first fluid outlet, and a second fluid outlet;
   the fluid inlet of the first fluid separator being in communication with a source of a fluid mixture to be separated into at least a first component and a second component;
   the second fluid outlet of the first separator being in communication with the fluid inlet of the second fluid separator;
   means for sensing at least one fluid parameter of fluid introduced into the fluid inlet of the first fluid separator;
   a recycle conduit connecting at least one of the first or second fluid outlets of either of the first or second fluid separators to the fluid inlet of the first fluid separator without a reservoir therebetween for diverting fluid directly from the at least one first or second fluid outlets of either of the first or second fluid separators to the fluid inlet of the first fluid separator: and means for adjusting the volume of fluid passed through the recycle conduit in response to a signal provided by the sensing means.

4. A downhole fluid separation system comprising:

a first fluid separator and a second fluid separator, each fluid separator having a fluid inlet, a first fluid outlet, and a second fluid outlet;

the fluid inlet of the first fluid separator being in communication with a source of a fluid mixture to be separated into at least a first component and a second component;

the second fluid outlet of the first separator being in communication with the fluid inlet of the second fluid separator;

means for sensing at least one fluid parameter of fluid introduced into the fluid inlet of the second fluid separator;

a recycle conduit connecting at least one of the first or second fluid outlets of the second fluid separator to the fluid inlet of the second fluid separator without a reservoir therebetween for diverting fluid directly from the at least one of the first or second fluid outlets of the second fluid separator to the fluid inlet of the second fluid separator; and means for adjusting the volume of fluid passed through the recycle conduit in response to a signal provided by the sensing means.

5. A downhole fluid separation system for use with one or more downhole pumping systems, comprising:

a first hydrocyclone and a second hydrocyclone, each hydrocyclone having a fluid inlet, a first fluid outlet, and a second fluid outlet;

the fluid inlet of the first hydrocyclone being in communication with a downhole pumping system that provides a fluid mixture to be separated into at least a first component and a second component;

the first fluid outlet of the first hydrocyclone being in communication with the fluid inlet of the second hydrocyclone;

an electronic sensing device for sensing at least one fluid parameter of fluid introduced into the fluid inlet of the second hydrocyclone;

a recycle conduit connecting at least one of the first or second fluid outlets of the second fluid hydrocyclone to the fluid inlet of the second hydrocyclone without a reservoir therebetween for diverting fluid directly from the at least one of the first or second fluid outlets of the second fluid separator to the fluid inlet of the second hydrocyclone; and a valve for adjusting, in response to a signal provided by the sensing device, the, volume of fluid introduced into the fluid inlet of the second hydrocyclone.

6. A downhole fluid separation system for use with one or more downhole pumping systems, comprising:

a first hydrocyclone and a second hydrocyclone, each hydrocyclone having a fluid inlet, a first fluid outlet, and a second fluid outlet;

the fluid inlet of the first hydrocyclone being in communication with a downhole pumping system that provides a fluid mixture to be separated into at least a first component and a second component;

the second fluid outlet of the first hydrocyclone being in communication with the fluid inlet of the second hydrocyclone;

an electronic sensing device for sensing at least one fluid parameter of fluid introduced into the fluid inlet of the first hydrocyclone;

a recycle conduit connecting at least one of the first or second fluid outlets of the first or second hydrocyclones to the fluid inlet of the first hydrocyclone without a reservoir therebetween for diverting fluid directly from the at least one of the first or second fluid outlets of the first or second hydrocyclones to the fluid inlet of the first hydrocyclone; and a valve for adjusting, in response to a signal provided by the sensing device, the volume of fluid introduced into the fluid inlet of the first hydrocyclone.

7. A downhole fluid separation system for use with one or more downhole pumping systems, comprising:

a first hydrocyclone and a second hydrocyclone, each hydrocyclone having a fluid inlet, a first fluid outlet, and a second fluid outlet;

the fluid inlet of the first hydrocyclone being in communication with a downhole pumping system that provides a source of a fluid mixture to be separated into at least a first component and a second component;

the second fluid outlet of the first hydrocyclone being in communication with the fluid inlet of the second hydrocyclone;

an electronic sensing device for sensing at least one fluid parameter of fluid introduced into the fluid inlet of the second hydrocyclone;

a recycle conduit connecting at least one of the first or second fluid outlets of the second hydrocyclone to the fluid inlet of the second hydrocyclone without a reservoir therebetween for diverting fluid directly from the at least one of the first or second fluid outlets of the second hydrocyclone to the fluid inlet of the second hydrocyclone; and a valve for adjusting, in response to a signal provided by the sensing device, the volume of fluid introduced into the fluid inlet of the second hydrocyclone.

8. A method of separating a multi-component fluid stream in a downhole well into at least two fluid components comprising:

providing a first fluid separator and a second fluid separator, each fluid separator having a fluid inlet, a first fluid outlet, and a second fluid outlet;

directing the multi-component fluid stream through the fluid inlet of the first fluid separator;

separating the multi-component fluid stream into a first fluid stream and a second fluid stream, the first fluid stream including a first fluid component, and the second fluid stream including a second fluid component;

directing the first fluid stream from the first fluid outlet of the first fluid separator to the fluid inlet of the second fluid separator;

directing the second fluid stream from the second fluid outlet of the first fluid separator to one of a fluid separation device and a subterranean formation;

separating the first fluid stream into a third fluid stream and a fourth fluid stream, the third fluid stream including the first fluid component, and the fourth fluid stream including the second fluid component;

directing the third fluid stream from the first fluid outlet of the second fluid separator to the earth's surface;

directing the fourth fluid stream from the second fluid outlet of the second fluid separator to one of a fluid separation device and a subterranean formation;

sensing at least one fluid parameter of the first fluid stream; and using the at least one fluid parameter to control back pressure across the first fluid separator and to regulate the composition of the first fluid stream entering the fluid inlet of the second fluid separator.

9. The method of claim 8, comprising directing a portion of the fourth fluid stream to the fluid inlet of the first fluid separator.

10. The method of claim 8, wherein the first fluid separator is a deoiling hydrocyclone and the second fluid separator is a dewatering hydrocyclone.

11. The method of claim 8, comprising transmitting a signal corresponding to the at least one fluid parameter to a valve, and using the valve to control flow of the second fluid stream.

12. The method of claim 8, comprising controlling back pressure across the second fluid separator.

13. The method of claim 8, comprising pumping fluid into the fluid inlet of the first fluid separator.

14. The method of claim 8, wherein the second fluid component is water, and at least approximately 65 percent of the multi-component fluid stream comprises the second fluid component.

15. A method of separating a multi-component fluid stream in a downhole well into at least two fluid components comprising:
    providing a first fluid separator and a second fluid separator, each fluid separator having a fluid inlet, a first fluid outlet, and a second fluid outlet;
    directing the multi-component fluid stream through the fluid inlet of the first fluid separator;
    separating the multi-component fluid stream into a first fluid stream and a second fluid stream, the first fluid stream including a first fluid component, and the second fluid stream including a second fluid component;
    directing the first fluid stream from the first fluid outlet of the first fluid separator to one of a fluid separation device and the earth's surface;
    directing the second fluid stream from the second fluid outlet of the first fluid separator to the fluid inlet of the second fluid separator;
    separating the first fluid stream into a third fluid stream and a fourth fluid stream, the third fluid stream including the first fluid component, and the fourth fluid stream including the second fluid component;
    directing the third fluid stream from the first fluid outlet of the second fluid separator to the fluid inlet of the first fluid separator;
    directing the fourth fluid stream from the second fluid outlet of the second fluid separator to one of the fluid inlet of the first fluid separator and a subterranean formation;
    sensing at least one fluid parameter of the fluid stream; and
    using the at least one fluid parameter to regulate the composition of the fluid stream entering the fluid inlet of the first fluid separator.

16. The method of claim 15, comprising directing a portion of the fourth fluid stream to the fluid inlet of the first fluid separator.

17. The method of claim 15, wherein the first and second fluid separators are deoiling hydrocyclones.

18. The method of claim 15, comprising transmitting a signal corresponding to the at least one fluid parameter to a valve, and using the valve to control flow of fluid entering the fluid inlet of the first fluid separator.

19. The method of claim 15, comprising pumping fluid into the fluid inlet of the first fluid separator.

20. The method of claim 15, wherein the second fluid component is water, and at least approximately 35 percent but not more than approximately 65 percent of the multi-component fluid stream comprises the second fluid component.

21. A method of separating a multi-component fluid stream in a downhole well into at least two fluid components comprising:
    providing a first fluid separator and a second fluid separator, each fluid separator having a fluid inlet, a first fluid outlet, and a second fluid outlet;
    directing the multi-component fluid stream through the fluid inlet of the first fluid separator;
    separating the multi-component fluid stream into a first fluid stream and a second fluid stream, the first fluid stream including a first fluid component, and the second fluid stream including a second fluid component;
    directing the first fluid stream from the first fluid outlet of the first fluid separator to one of a fluid separation device and the earth's surface;
    directing the second fluid stream from the second fluid outlet of the first fluid separator to the fluid inlet of the second fluid separator;
    separating the first fluid stream into a third fluid stream and a fourth fluid stream, the third fluid stream including the first fluid component, and the fourth fluid stream including the second fluid component;
    directing the third fluid stream from the first fluid outlet of the second fluid separator to the fluid inlet of the first fluid separator;
    directing the fourth fluid stream from the second fluid outlet of the second fluid separator to one of the fluid inlet of the second fluid separator and a subterranean formation;
    sensing at least one fluid parameter of the fluid stream; and
    using the at least one fluid parameter to regulate the composition of the fluid stream entering the fluid inlet of the second fluid separator.

22. The method of claim 21, wherein the first fluid separator is a dewatering hydrocyclone and the second fluid separator is a deoiling hydrocyclone.

23. The method of claim 21, comprising transmitting a signal corresponding to the at least one fluid parameter to a valve, and using the valve to control flow of fluid entering the fluid inlet of the second fluid separator.

24. The method of claim 21, comprising pumping fluid into the fluid inlet of the second fluid separator.

25. The method of claim 21, wherein the sensing step comprises sensing at least one fluid parameter of the fluid stream entering the fluid inlet of the second fluid separator.

26. The method of claim 21, wherein the second fluid component is water, and not more than approximately 35 percent of the multi-component fluid stream comprises the second fluid component.

* * * * *